(No Model.)

R. H. BECKWITH.
SEWER GAS TRAP.

No. 316,110. Patented Apr. 21, 1885.

Witnesses
Harold Serrell
Chas. H. Smith

Inventor
Russel H. Beckwith
per Lemuel W. Serrell
Atty.

UNITED STATES PATENT OFFICE.

RUSSEL H. BECKWITH, OF NEW YORK, N. Y.

SEWER-GAS TRAP.

SPECIFICATION forming part of Letters Patent No. 316,110, dated April 21, 1885.

Application filed December 19, 1884. (No model.)

*To all whom it may concern:*

Be it known that I, RUSSEL H. BECKWITH, of the city, county, and State of New York, have invented a new and useful Improvement in Sewer-Gas Traps, and the following is declared to be a description of the same.

Traps and valves for sewer-gas have been employed heretofore, and said valves have been provided with a weighted lever inside of a vessel, and are thereby closed automatically against their seats. In this case, the lever and weight being inside, the vessel was liable to catch and retain pieces passing through the trap and to become easily clogged up.

My invention relates to a trap for preventing sewer-gas escaping into buildings; and it consists in a section of cast-iron pipe having a square portion in the central part and round portions at the ends. A square valve is placed in the square portion, and said valve is upon a stem that extends outside the case, and is provided with a lever and weight to keep the valve closed against its seat, and with a washer and nut upon the stem to close the opening through which the stem passes. The passage of water opens the valve and the weight closes it again. A frame having a glass sight forms one side of the square portion, and through said sight it can be seen if the valve is clogged and needs cleaning, and said frame can be removed to get access to the valve and to remove it from the square portion of the trap.

Figure 2:
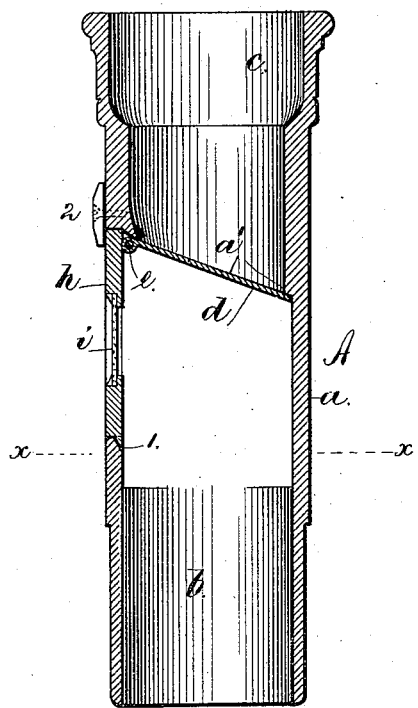
Figure 1:
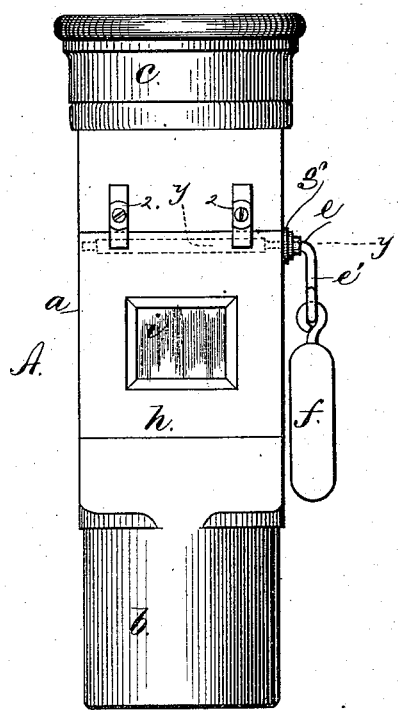
Figure 3:
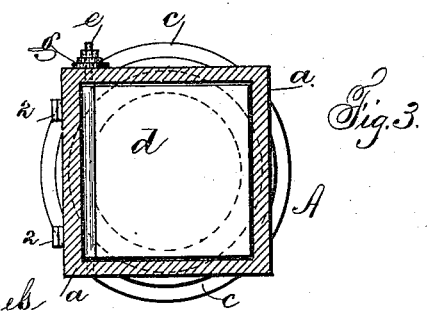
Figure 4:
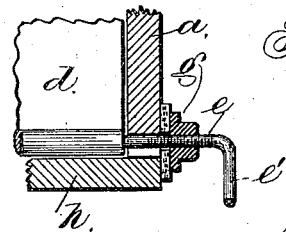

In the drawings, Figure 1 is an elevation of the trap. Fig. 2 is a vertical section of the same. Fig. 3 is a cross-section at the line $xx$ of Fig. 2, and Fig. 4 is a cross-section in larger size at the line $yy$.

The trap A is made as a section of cast-iron sewer-pipe, and is composed of the square portion $a$, the lower round portion, $b$, and the upper round portion, $c$. This trap is designed to set vertically in and form a part of the sewer-pipe, the pipe above it being received into the round part $c$, and the end $b$ received into the enlarged end of the pipe below it. The square portion $a$ has an inclined valve-seat at $a'$, and there is a square valve, $d$, upon the valve-stem $e$, and said stem extends outside the portion $a$ and is curved downward and provided with an eye to which the weight $f$ is attached. The valve-stem at $e'$ outside of the trap forms a lever which, acted upon by the weight $f$, keeps the valve $d$ closed against the seat $a'$, and prevents the sewer-gas rising in the pipe. There are a screw-button and leather washer at $g$, upon the valve-stem $e$, that close the opening where the stem passes into a slot in the side of the trap.

At $h$, I provide a removable plate to the square trap portion $a$, and in this side there is a glass sight, $i$, through which it can be seen if the trap is clogged and needs cleaning, and said side can be removed to get access to and remove the valve. This side is held in place by the projecting lip 1 and the buttons 2, and it can be made gas-tight when in place in any desired manner. When the side $h$ is taken away, the valve $d$ can be readily lifted out.

It is preferable to place this trap in the vertical sewer-pipe in the lower part of a house just above the incline pipe that passes off to the sewer.

I am aware that there is nothing new in a sewer-trap having round end portions and a central chamber in which is a valve closing against an inclined seat, and I am aware that the use of glass in connection with a trap is not new, and that an internal valve operated by an external weight is not new, and such devices I disclaim.

I claim as my invention—

1. The sewer-pipe section cast in one piece and composed of the square portion $a$, with an open side, and containing an inclined valve-seat and the round end portions, $b\ c$, the portion $b$ capable of setting into the pipe below, and the portion $c$ adapted to receive the pipe above, in combination with a removable plate having a glass therein, said plate fitting the open side of the square portion $a$, the square valve and the stem thereof made together and held in bearings in the portion $a$, contiguous to the removable plate, and a lever to the valve-stem and a weight upon the lever, substantially as set forth.

2. The sewer-pipe section cast in one piece and composed of the square portion $a$, with an open side, and containing an inclined valve-seat and the round end portions, $b\ c$, the portion *b* capable of setting into the pipe below, and the portion *c* adapted to receive the pipe above, in combination with a removable plate having a glass therein, said plate fitting the open side of the square portion *a*, the square valve and the stem thereof made together and held in bearings in the portion *a*, contiguous to the removable plate, a screw-nut upon the valve-stem, and a washer that is clamped by the nut against the outer surface of the portion *a*, and a lever to the valve-stem and a weight upon the lever, substantially as set forth.

Signed by me this 16th day of December, A. D. 1884.

RUSSEL H. BECKWITH.

Witnesses:
GEO. T. PINCKNEY,
WILLIAM G. MOTT.